US011158308B1

(12) United States Patent
Bissell et al.

(10) Patent No.: US 11,158,308 B1
(45) Date of Patent: Oct. 26, 2021

(54) CONFIGURING NATURAL LANGUAGE SYSTEM

(71) Applicant: Amazon Technologies, Inc., Seattle, WA (US)

(72) Inventors: Anthony Bissell, Somerville, MA (US); Pragati Verma, Melrose, MA (US); Skye Loren Huerta, Cambridge, MA (US); Akhil Chandrashekhar Acharya, Cambridge, MA (US); Susanna Rose Young, Cambridge, MA (US); Jean-Michel Caruge, Somerville, MA (US); Christopher Wheeler, Cambridge, MA (US)

(73) Assignee: Amazon Technologies, Inc., Seattle, WA (US)

(*) Notice: Subject to any disclaimer, the term of this patent is extended or adjusted under 35 U.S.C. 154(b) by 64 days.

(21) Appl. No.: 16/697,996

(22) Filed: Nov. 27, 2019

(51) Int. Cl.
  *G10L 15/18* (2013.01)
  *G10L 15/22* (2006.01)
  *G10L 15/30* (2013.01)

(52) U.S. Cl.
  CPC .......... *G10L 15/1815* (2013.01); *G10L 15/22* (2013.01); *G10L 15/30* (2013.01); *G10L 2015/223* (2013.01)

(58) Field of Classification Search
  None
  See application file for complete search history.

(56) References Cited

U.S. PATENT DOCUMENTS

| 7,669,770 | B2* | 3/2010 | Wheeler | G06F 3/0238 235/472.01 |
| 8,781,833 | B2* | 7/2014 | Duta | G10L 15/1815 704/257 |
| 9,147,213 | B2* | 9/2015 | Beaver, III | G06T 15/00 |
| 10,423,621 | B2* | 9/2019 | Bhaya | G06F 40/205 |
| 2012/0173376 | A1* | 7/2012 | Soroca | G06Q 30/08 705/26.3 |
| 2015/0066496 | A1* | 3/2015 | Deoras | G06N 3/0454 704/232 |
| 2016/0071517 | A1* | 3/2016 | Beaver | G10L 15/22 704/9 |
| 2016/0078866 | A1* | 3/2016 | Gelfenbeyn | G06F 40/247 704/9 |
| 2016/0225370 | A1* | 8/2016 | Kannan | G10L 15/063 |
| 2019/0027135 | A1* | 1/2019 | Kim | G06F 40/20 |
| 2019/0130244 | A1* | 5/2019 | Mars | G06N 3/08 |
| 2019/0180742 | A1* | 6/2019 | Kothari | G10L 15/1822 |
| 2019/0180757 | A1* | 6/2019 | Kothari | H04W 4/021 |
| 2020/0184959 | A1* | 6/2020 | Yasa | G10L 15/1815 |
| 2020/0192684 | A1* | 6/2020 | Woo | G06F 9/451 |

* cited by examiner

*Primary Examiner* — Marcus T Riley
(74) *Attorney, Agent, or Firm* — Pierce Atwood LLP

(57) ABSTRACT

Example embodiments provide techniques for configuring a natural language processing (NLU) system for new functionalities using sample user inputs provided by a developer. The system may determine intent labels associated with the sample user inputs using previous user inputs previously processed by the NLU system. The system may configure a new NLU model, using the NLU model associated with the intent label determined by the system, where the new NLU model is configured to enable invocation of the new functionality.

20 Claims, 10 Drawing Sheets

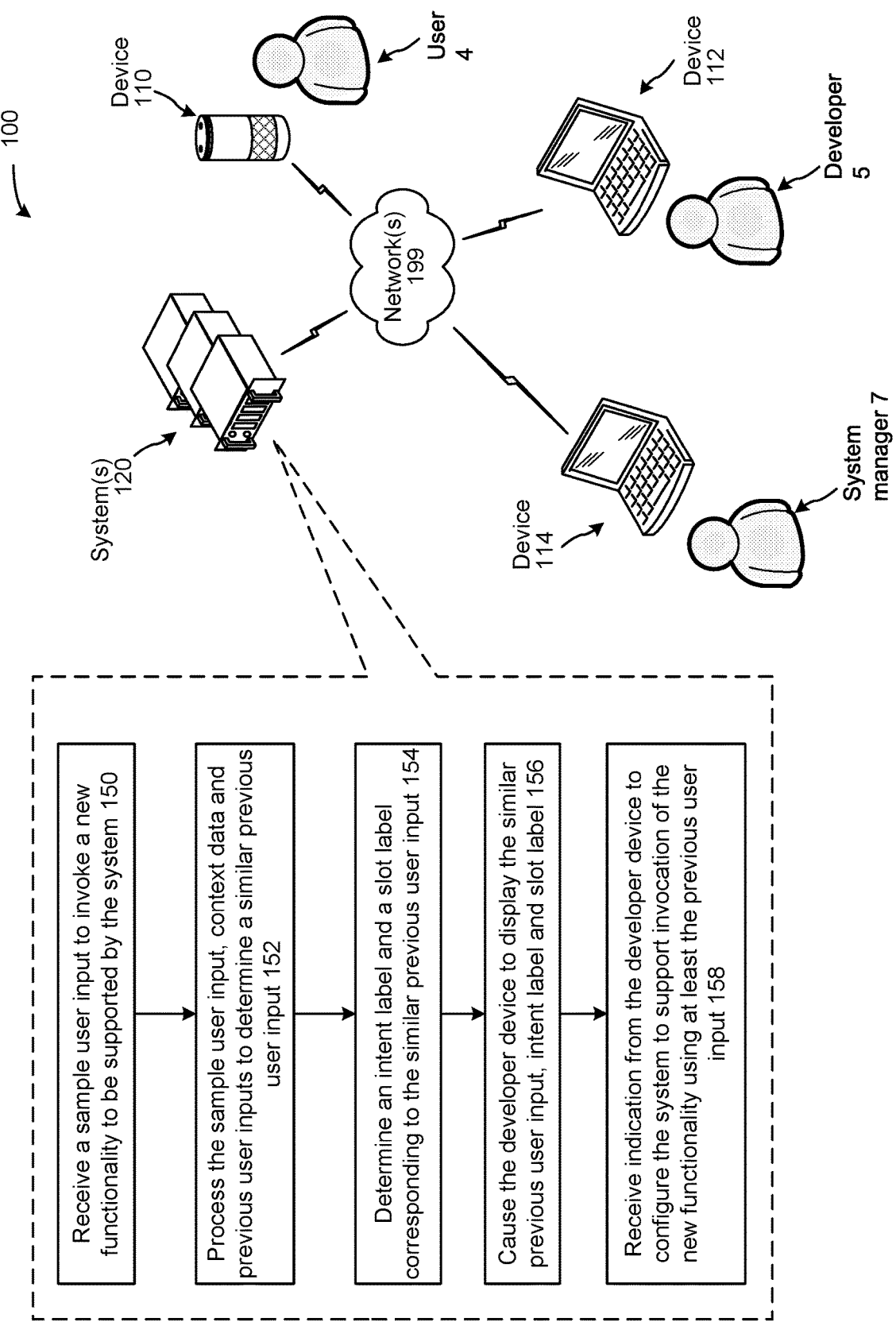

US 11,158,308 B1

CONFIGURING NATURAL LANGUAGE SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system for creating new functionality in a natural language processing system using sample user inputs to configure NLU models, in accordance with embodiments of the present disclosure.

DETAILED DESCRIPTION

Figure 1B:
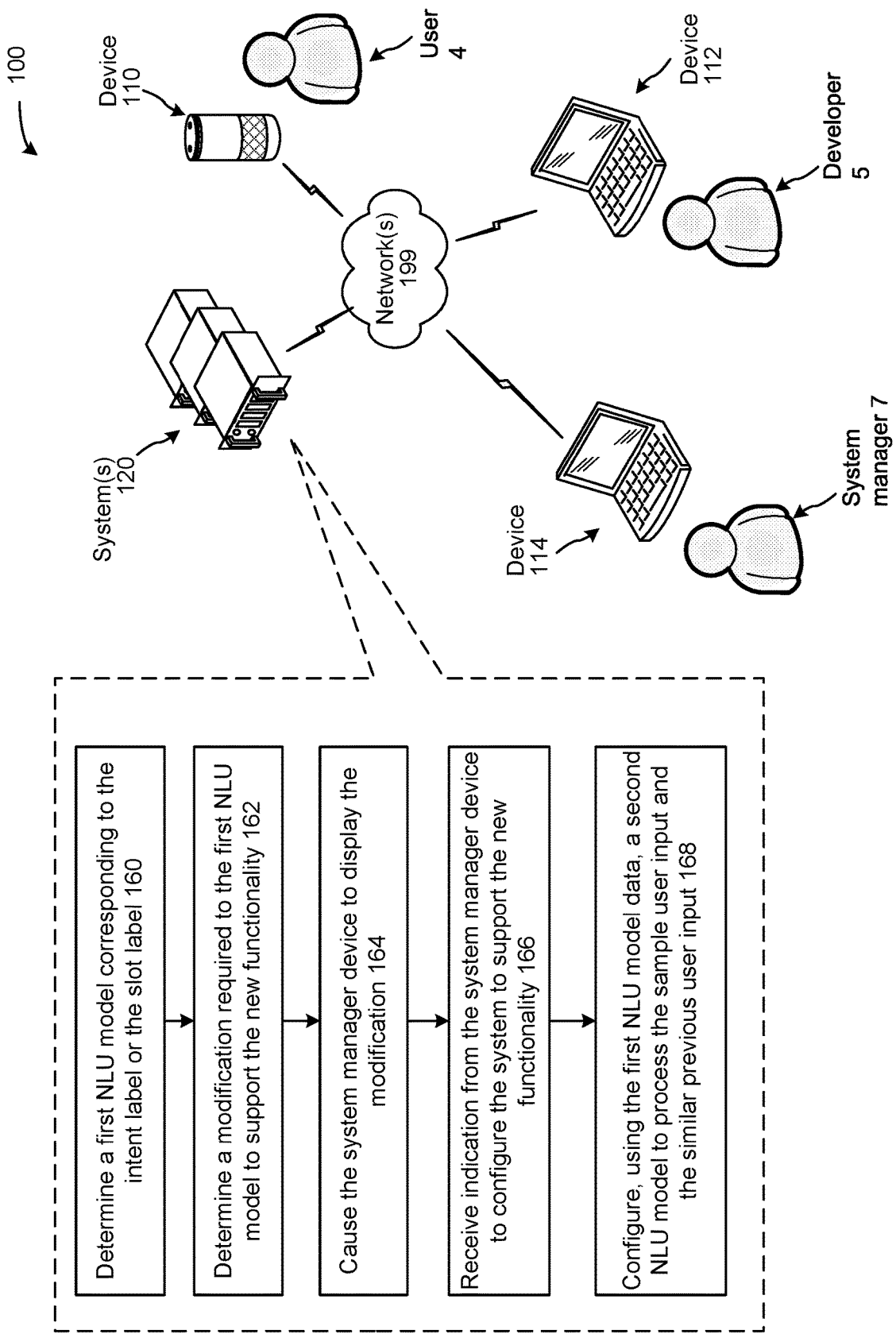

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to natural language user inputs. For example, for the user input of "play Adele music," a system may output music sung by an artist named Adele. For further example, for the user input of "turn on the lights," a system may turn on "smart" lights associated with the user's profile, for the user input of "adjust the oven temperature to 325," the system may cause the "smart" oven associated with the user's profile to change the temperature to 325° F.

To respond to such natural language user inputs, a system may implement NLU models configured to perform one or more NLU operations such as intent classification, entity recognition, or others, such as those described below. As used herein, a "skill," and derivations thereof, may refer to software, running on a system, that is akin to a software application running on a traditional computing device. That is, a skill may enable a system to execute specific functionality in order to provide data or produce some other requested output. Example skills may include weather information skills, music playing skills, or the like. While "skill" and derivations thereof may be used herein, the functionality described herein as a skill may be referred to using many different terms, such as an action, bot, app, or the like.

As used herein, a "domain," and derivatives thereof, may refer to a grouping of like functionality provided by the system. Example domains include smart home, music, video, flash briefing, shopping, and custom (e.g., functionality that is not associated with any pre-configured domain). Multiple skills may be associated with a domain. For example the music domain may include skills like Amazon Music, Pandora, Spotify, etc. In another example the Shopping domain may include skills corresponding to various retailers and other entities that provide items for purchase. An NLU model may be associated with a domain and may be configured to process user inputs relating to the particular domain by incorporating words that are likely to be used with respect to the particular domain.

During runtime system operation, when the system evaluates a user input, an NLU model may generate a representation of a natural language user input, where the representation may be further processable by a corresponding skill to perform an action to output data or perform some other functionality (e.g., output weather data, play a song, turn on lights, etc.).

To configure a natural language processing system for a new functionality or to update an existing functionality, a developer may be required to understand not only how to edit files, but also may need to understand parameters of the files, ramifications of making changes to the parameters, and downstream effects of making such changes. The developer may need extensive training and knowledge of the NLU models, which intents and slots are supported by the system, which NLU models are associated with which domains, how edits to an NLU model may affect functionalities supported by other domains, etc. The developer may also need other resources, such as a large amount of training data, time and computing resources, to train the NLU models to incorporate the new functionality or changes to an existing functionality. Additionally, a developer may need approval from system managers before changes are made to the NLU models.

The present disclosure provides an improved NLU authoring tool that can be used by developers to configure new experiences for end users without having extensive training and knowledge of the NLU models employed by the system. As used herein, a "developer" may be a user of the system that wants to provide an experience, a feature or other type of functionality to end users, and wants to configure the system to support such new experiences, features or functionalities. Using the improved tool, a developer can provide sample user inputs (that may be spoken by an end user or entered via other formats, such as text, etc.) that may be used to invoke the new functionality. The system determines the potential intents and slots corresponding to the sample user inputs using previous inputs that may be similar to the sample user inputs and that were previously processed by the system and labeled with intents and slots. The developer may provide the sample user inputs using a web-based interface that may display other information related to building the new functionality as described below. Using the improved NLU authoring tool, the developer can also change existing functionalities, for example, by adding, removing or modifying user inputs associated with an existing functionality.

The potential intents and slots may be presented to the developer for confirmation, and the developer may instruct the system to build the appropriate NLU models to support the new functionality. Thus, provided, among other things, is an improved experience for developers by reducing the time and effort required to setup new functionalities.

In some cases, the system may configure an existing NLU model to support invocation of the new functionality using the sample user inputs and other previous inputs that the developer chooses. Also disclosed is a mechanism to present the potential results or ramifications of the build to the developer and also to system managers. The system may determine which domain, NLU model or functionality will be affected if the NLU models requested by the developer are build, and the system may send a notification to the system managers associated with the affected components. The system managers may use the web-based interface to view the potential results of the build, review other data related to the build, and approve or deny the developer's request. Thus, the present disclosure may provide an improved experience to system managers as well when reviewing requests for new NLU models or changes to NLU models.

NLU models are configured to process a particular natural language, and to provide functionalities in different languages requires configuration of other NLU models. For example, user inputs provided in English may be supported by a first NLU model, while user inputs provided in Spanish may be supported by a second NLU model. The present disclosure may provide a mechanism to allow the developer to provide the new functionality in multiple languages. The system may determine whether previous inputs similar to the sample user inputs provided by the developer are supported by the system for other languages, and present the option to extend support for the new functionality in the other languages. For example, at least one NLU model may be configured to process the user input (in English) "what is the weather in Seattle." The system may determine whether there is a NLU model configured to process the same user input in Spanish or Japanese, and whether that NLU model can be configured to support the developer's functionality.

FIGS. 1A and 1B show a system configured to create a new functionality using sample user inputs from a developer. Although the figures and discussion illustrate certain operational steps of the system in a particular order, the steps described may be performed in a different order (as well as certain steps removed or added) without departing from the intent of the disclosure. As shown in FIGS. 1A and 1B, the system 100 may include a device 110 local to a user 4, a device 112 local to a developer 5, a device 114 local to a system manager 7, and one or more systems 120 connected across one or more networks 199. The device 112, 114 may be a desktop computer, laptop, tablet, smart phone, or other device that is capable of receiving inputs from the developer 5 and system manager 7 for configuring a natural language processing system (e.g., system(s) 120) to support a new functionality. The device 110 may be any of the devices shown in FIG. 9 or other type of device that is capable of receiving inputs (e.g., text, voice, visual, etc.) inputs from a user 4. The developer 5 may configure system 100, using the device 112, to provide a particular functionality to the user 4 via the device 110.

The developer 5 using the device 112 and the system manager 7 using the device 114 may access the NLU authoring tool implemented by the system(s) 120. In some embodiments, the NLU authoring tool may be a web-based user interface. The developer 5 may provide the device 112 (and by extension the NLU authoring tool) with text data representing sample user inputs that may be used to invoke the new functionality. As used herein, new functionality may refer to a functionality that the NLU system does not presently support, and may include one or more related actions or tasks. For example, a functionality associated with a toaster oven may include actions that cause the toaster oven to turn on and off, control the temperature of the toaster oven, and other actions relating to the toaster oven.

Referring to FIG. 1A, the system(s) 120 receives (150) sample user inputs to invoke the new functionality to be supported by the NLU system. For example, the developer 5 may want to create a new functionality that enables end users to interact with a smart toaster oven. The developer 5 may determine some potential user inputs that would allow an end user to interact with the smart toast over, such as, "turn on the toaster" and "set the temperature of the toaster oven." The developer 5 may provide these inputs as sample user inputs to the system(s) 120 to configure the natural language processing system to invoke the new functionality.

Figure 6:
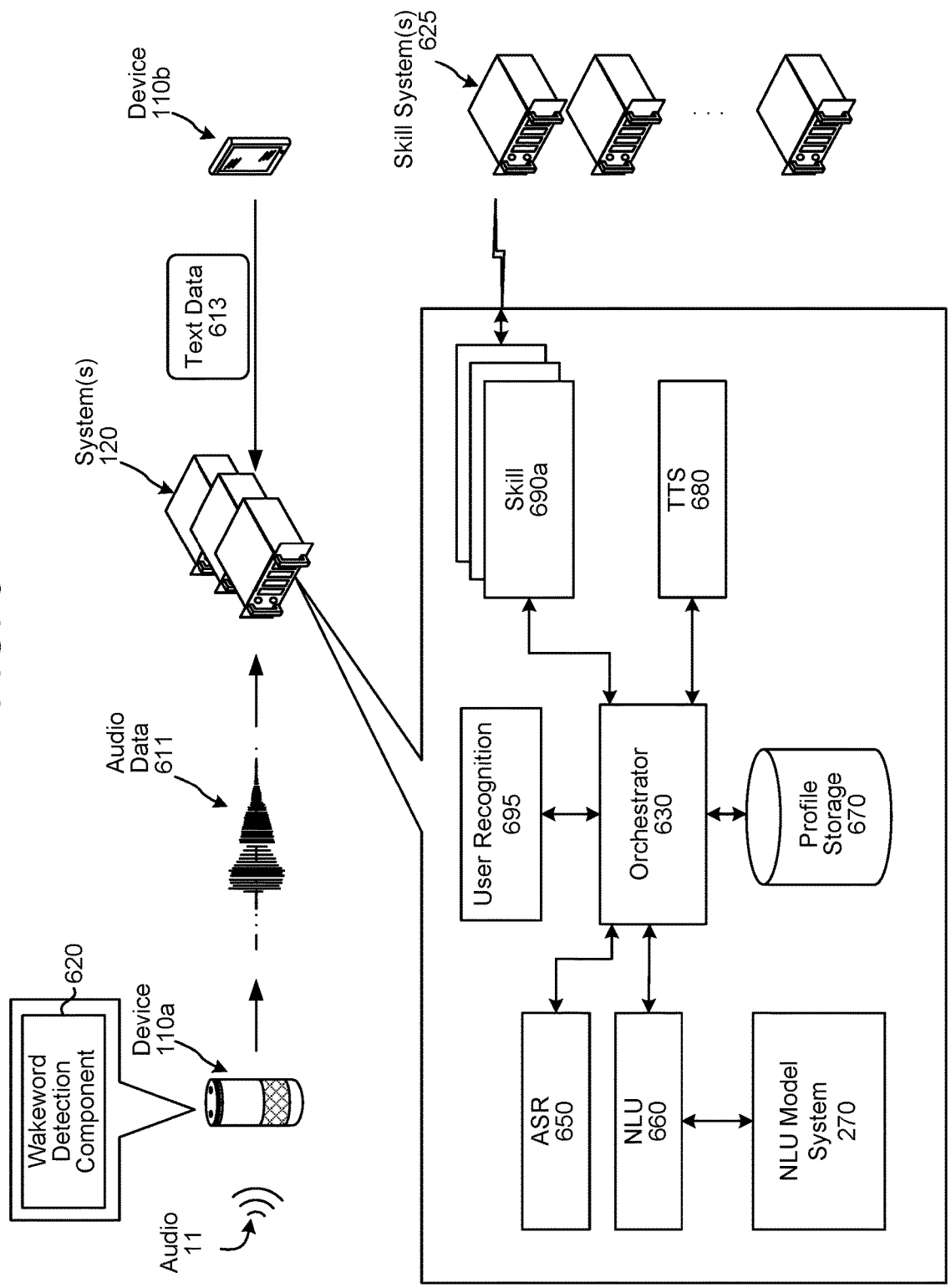
FIG. 6 is a conceptual diagram of components of a system, in accordance with embodiments of the present disclosure.

In some embodiments, these inputs may be utterances spoken by an end user and processed using a speech processing system (e.g., as illustrated in FIG. 6) to determine an action or output responsive to the utterance. In other embodiments, these inputs may be provided by an end user in text format or other formats.

In some embodiments, the system(s) 120 may also receive context data from the developer 5, the context data corresponding to the sample user input. In other embodiments, the system(s) 120 may determine context data corresponding to the sample user input using the sample user input. Context data may refer to events or other conditions that may have to exist to invoke the functionality using the sample user input. For example, context data may specify a device type, a language, activation of other device component(s), output data being presented to the user (of device 110), etc.

The system(s) 120 processes (152) the sample user inputs, context data and previous user inputs to determine previous user inputs that may be similar to the sample user inputs. The system(s) 120 may access a database (e.g., database 240 of FIG. 2) storing data relating to previous user inputs that were received by the NLU system and previously processed. As part of processing these inputs, the NLU system may determine intent labels and slot labels corresponding to each user input so that the NLU system may determine an action or output responsive to the user input. The database may store text representing the previous user inputs, the corresponding intent label and the corresponding slot label. For example, the database may include first data related to a first previous input: ("turn on the oven," intent label: "on", slot label: device), second data related to a second previous input: ("play a rap song," intent label: "play", slot label: "song"), third data related to a third previous input: ("adjust the oven temperature," intent label: "control temperature," slot label: "device"), etc.

Figure 2:
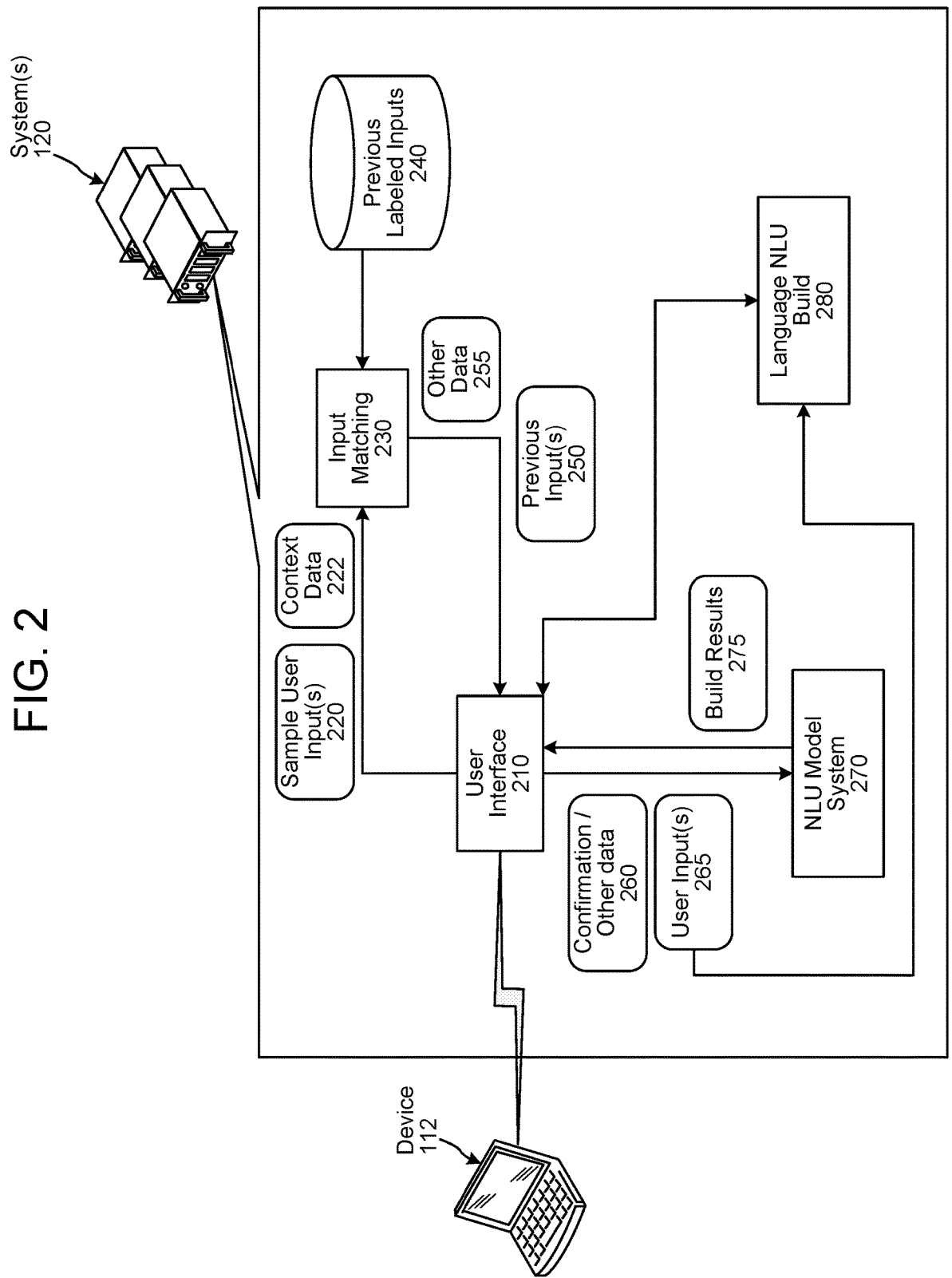
FIG. 2 is a conceptual diagram illustrating the components used to create new functionality using sample user inputs, in accordance with embodiments of the present disclosure.

The system(s) 120 may use various techniques to determine previous user inputs that are similar to the sample user inputs as described in further detail with relation to component 230 of FIG. 2. For example, the system(s) 120 may use fuzzy string matching techniques by processing text representing the sample user input and text representing a previous user input. The system(s) 120, for example, may determine that the first previous input "turn on the oven" is similar to the first sample user input "turn on the toaster." Similarly, the system(s) 120 may determine that the third previous input "adjust the oven temperature" is similar to the second sample user input "set the temperature of the toaster oven."

The system(s) 120 determines (154) an intent label and a slot label corresponding to the similar previous input, for example, using the database. The system(s) 120 may retrieve the intent label (e.g., intent label: "on" and the slot label (e.g., slot label: "device") associated with the first previous user input from the database. Similarly, the system(s) 120 may retrieve the intent label (e.g., intent label: "adjust temperature" and the slot label (e.g., slot label: "device") associated with the third previous user input from the database.

In a non-limiting example, the developer 5 may provide the sample user input "set timer" and the context data may indicate device type as microwave. In another example, the developer 5 may provide the sample user input "set timer on microwave" and the system(s) 120 may determine that the device type is microwave. In another example, the developer 5 may provide the sample user input "set timer" and the context data may indicate that a button on a microwave (e.g., a push-to-talk button, a button enabling the device to receive voice input, etc.) is active or pushed by the user. In all of these examples, the developer 5 may want the sample user input to cause a microwave to set a timer. The system(s) 120, when processing the sample user input, context data and previous user inputs to determine a similar previous user input, may also determine the similar previous user input such that the context data associated with the previous user input is the same as the context data associated with the sample user input. In other words, the system(s) 120 may determine the previous user input is similar to the sample user input because the previous user input is associated with a microwave (e.g., causes an action related to a microwave). In these examples, the intent label corresponding to the previous user input may be "set_timer_microwave_intent." As described below, the system(s) 120 configure an NLU model so that the sample user input "set timer" and any conditions specified by the context data causes the system(s) 120 to set a timer on a microwave associated with the profile of the user 4.

The system(s) 120 causes (156) the developer device 112 to display text representing the similar previous user inputs and the corresponding intent and slot labels. Thus, the system(s) 120 presents to the developer potential intents and slots corresponding to the sample user inputs provided by the developer, and the developer does not need extensive knowledge of the various intents and slots supported by the NLU system.

In some embodiments, the system(s) 120 may determine one or more additional user inputs that are often used with the similar previous user input. That is, the system(s) 120 may determine that a particular user input is often provided by the users that also provide the similar previous user inputs. For example, the system(s) may determine that the user input "turn off the oven" is often provided by users who provide "turn on the oven." The system(s) 120 may determine that the user input "turn off the oven" is often provided within a particular time period of the "turn on the oven" input. In this case, the system(s) 120 may display text representing the additional user inputs on the device 112 for the developer 5 to view.

In some embodiments, the system(s) 120 displays a list of user inputs (that may be previously labeled by the NLU system), their corresponding intent labels and slot labels. The developer 5 may be able to select which of the user inputs are to be used to invoke the new functionality. The developer 5 may also be able to change the intent label or the slot label.

The system(s) 120 receives (158) an indication from the developer device 112 to configure the NLU system to support invocation of the new functionality using the sample user inputs and the similar previous user inputs. In some cases, the developer 5 may provide input selecting one or more of the previous user inputs to be used to invoke the new functionality. The NLU authoring tool may enable the developer to change the intent label or the slot label associated with the displayed user inputs, to reflect an intent or slot that the developer wants to use to invoke the new functionality. The system(s) 120 may receive data from the device 112 indicating such changes.

Referring to FIG. 1B, the system(s) 120 determines (160) a first NLU model corresponding to the intent label or the slot label. The first NLU model may be an existing NLU model that the NLU system may have used to process the previous user input corresponding to the intent label or the slot label. For example, the system(s) 120 may determine which NLU model is configured to process the intent label: "on" and/or the slot label: "device."

The system(s) 120 determines (162) one or more modifications required to the first NLU model so that the NLU system supports invocation of the new functionality using the sample user inputs and the previous user inputs. For example, in some cases modifications may be required to various components of a NLU model to support new functionalities. A NLU model may be associated with various components such as finite state transducers (FSTs), NLU rule data, domain definitions, etc.

The system(s) 120 causes (164) a system manger device 114 to display the modifications to the first NLU model. The system(s) 120 may identify a system manager 7 corresponding to the first NLU model based on the intent, slot, domain or other information related to the first NLU model. Approval or permission from the system manager may be required to make changes to the NLU system in order to ensure that functionalities presently supported by the NLU system are not disrupted due to the changes made to incorporate the new functionality. The NLU authoring tool enables a system manager 7 to view the modifications that may be performed, including which components may be modified if the NLU model is configured for the new functionality. Providing such information to the system manager 7 speeds up the process of creating new functionalities for the NLU system.

The system(s) 120 receives (166) an indication from the system manager device 114 to proceed with the configuration. In response to receiving the indication, the system(s) 120 configures (168) a second NLU model to process the sample user inputs and the similar previous user inputs to invoke the new functionality. The system(s) 120 configures the second NLU model using model data associated with the first NLU model.

FIG. 2 illustrates components that may be used by the system(s) 120 to create a new functionality using sample user inputs. The system(s) 120 may include a user interface component 210, an input matching component 230, a NLU model system 270 and a language NLU build component 280. The system(s) 120 may also include a database storing data related to previously labeled inputs 240.

The database 240 may store user inputs previously received and processed by the system(s) 120. The system(s) 120 may process user inputs to determine corresponding intent labels and slot labels to be able to perform an action or generate an output corresponding to the user input. The database 240 may store text representing the previous user inputs (which may be utterances or other type of inputs) and the corresponding intent and slot labels. Multiple previous user inputs may correspond to the same intent and slot label. As used herein, an intent label or derivations thereof may refer to data (e.g., text) indicating the intent corresponding to the user input. As used herein, a slot label or derivations thereof may refer to data (e.g., text) indicating the slot name corresponding to the user input. For example, the database 240 may store data representing (first text, first intent label, first slot label), (second text, first intent label, first slot label), (third text, first intent label, second slot label), (fourth text, second intent label, third slot label), etc.

The user interface component 210 may generate an interface that is displayable on a display of (or associated with) the device 112. The interface may enable the developer 5 to enter one or more sample user inputs to be used to invoke the new functionality, review potential intents and slots associated with the sample user inputs, and review additional user inputs to include with the new functionality. The user interface component 210 may receive data, from the device 112, representing developer inputs received by the device 112 via the developer interface displayed thereby. The user interface component 210 may send data 220, 222, received from the device 112, to the input matching component 230. The sample user input(s) 220 may be text data. The context data 222 may also be text data indicating one or more conditions or context information associated with the sample user input to invoke the functionality.

The input matching component 230 may determine one or more previous user inputs that are similar to or match the sample user inputs provided by the developer 5. The input matching component 230 may calculate string or text similarities between the sample user input(s) 220 and the previous labeled inputs 240. The input matching component 230 may use fuzzy string matching techniques, Levenshtein distance techniques, cosine similarity techniques and/or other mechanisms to calculate the text similarity.

In computer science, fuzzy string matching is the technique of finding strings that match a pattern approximately (rather than exactly). In other words, fuzzy string matching is a type of search that will find matches even when words are misspelled or only partial words are entered. Fuzzy string techniques may also be known as approximate string matching.

In information theory, linguistics and computer science, the Levenshtein distance is a string metric for measuring the difference between two sequences. Informally, the Levenshtein distance between two words is the minimum number of single-character edits (insertions, deletions or substitutions) required to change one word into the other. In other words, the component 230 may calculate how many transformations are needed to perform on the string A to make it equal to string B.

Cosine similarity is a measure of similarity between two non-zero vectors of an inner product space that measures the cosine of the angle between them. The input matching component 230 may calculate the angle between two vectors by first constructing a vector space from all the 'sentences', in this case the sample user inputs 220 and the previous labeled inputs 240, that similarity is being calculated for. That vector space may have as many dimensions as there are unique words in all sentences combined.

Figure 3:
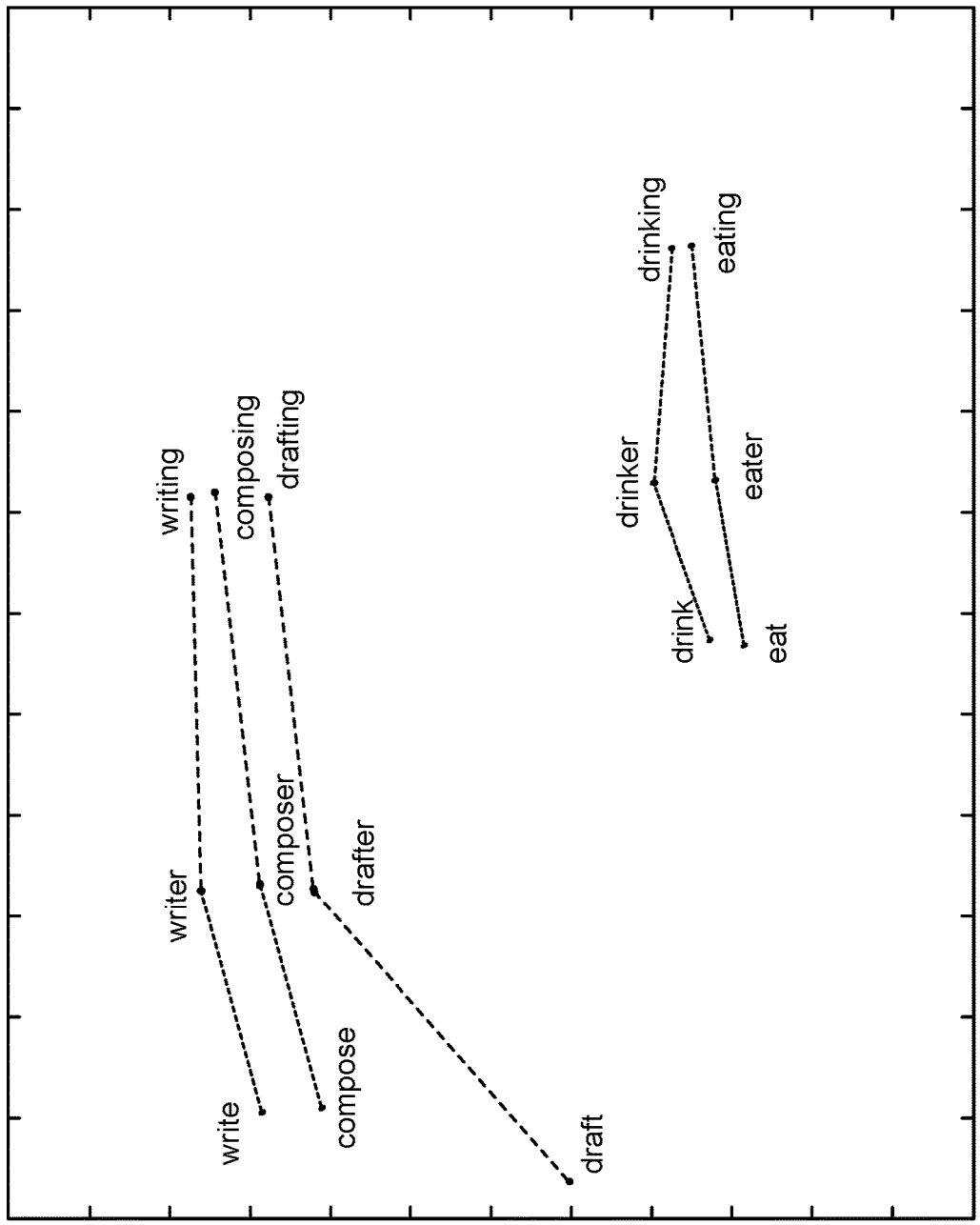
FIG. 3 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 3 illustrates a number of words in a hypothetical vector space where each point represents the vector location for the particular word. Although illustrated as located in a two-dimensional graph for discussion purposes, the usage vectors for the words illustrated in FIG. 3 would be in a high dimensional space. Further, FIG. 3 is shown for example purposes only and the vector locations/relationships do not necessarily reflect a true graphing of the usage of the illustrated words.

As illustrated in FIG. 3, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 3. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 3 exhibit similar relationships to each other as the words discussed above. The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings.

In some embodiments, the developer may provide context data 222 associated with the sample user input(s) 220. The context data 222 may indicate one or more conditions or context information associated with the sample user input to invoke the functionality. For example, context data may specify a device type, a language, activation of other device component(s), output data being presented to the user (of device 110), etc. The input matching component 230 may determine similar previous user inputs based on the context data associated with previous user input matching the context data of the sample user input.

In a non-limiting example, the developer 5 may provide the sample user input "set timer" and the context data may indicate device type as microwave. In another example, the developer 5 may provide the sample user input "set timer on microwave" and the input matching component 230 may determine that the device type is microwave. In another example, the developer 5 may provide the sample user input "set timer" and the context data may indicate that a button on a microwave (e.g., a push-to-talk button, a button enabling the device to receive voice input, etc.) is active or pushed by the user. In all of these examples, the developer 5 may want the sample user input to cause a microwave to set a timer. The input matching component 230 may also determine the similar previous user input such that the context data associated with the previous user input is the same as the context data associated with the sample user input. In other words, the input matching component 230 may determine the previous user input is similar to the sample user input because the previous user input is associated with a microwave (e.g., causes an action related to a microwave). In these examples, the intent label corresponding to the previous user input may be "set_timer_microwave_intent." The system may configure an NLU model so that the sample user input "set timer" and any conditions specified by the context data causes the system(s) 120 to set a timer on a microwave associated with the profile of the user 4.

In another non-limiting example, the developer may provide a sample user input 220 "select the best option" and the context data 222 may specify that the device 110 may be displaying a list of restaurants (or other entity, items, etc.). The input matching component 230 may determine a similar previous user input using such context data, and the corresponding intent label presented to the developer for confirmation may be "select_best_restaurant_intent." After confirmation from the developer, the system may configure the NLU model so that the user input "select the best option" when the device 110 is displaying a list of restaurants causes the device 110 to select the best/highest ranked restaurant from the list for further action.

Figure 4:
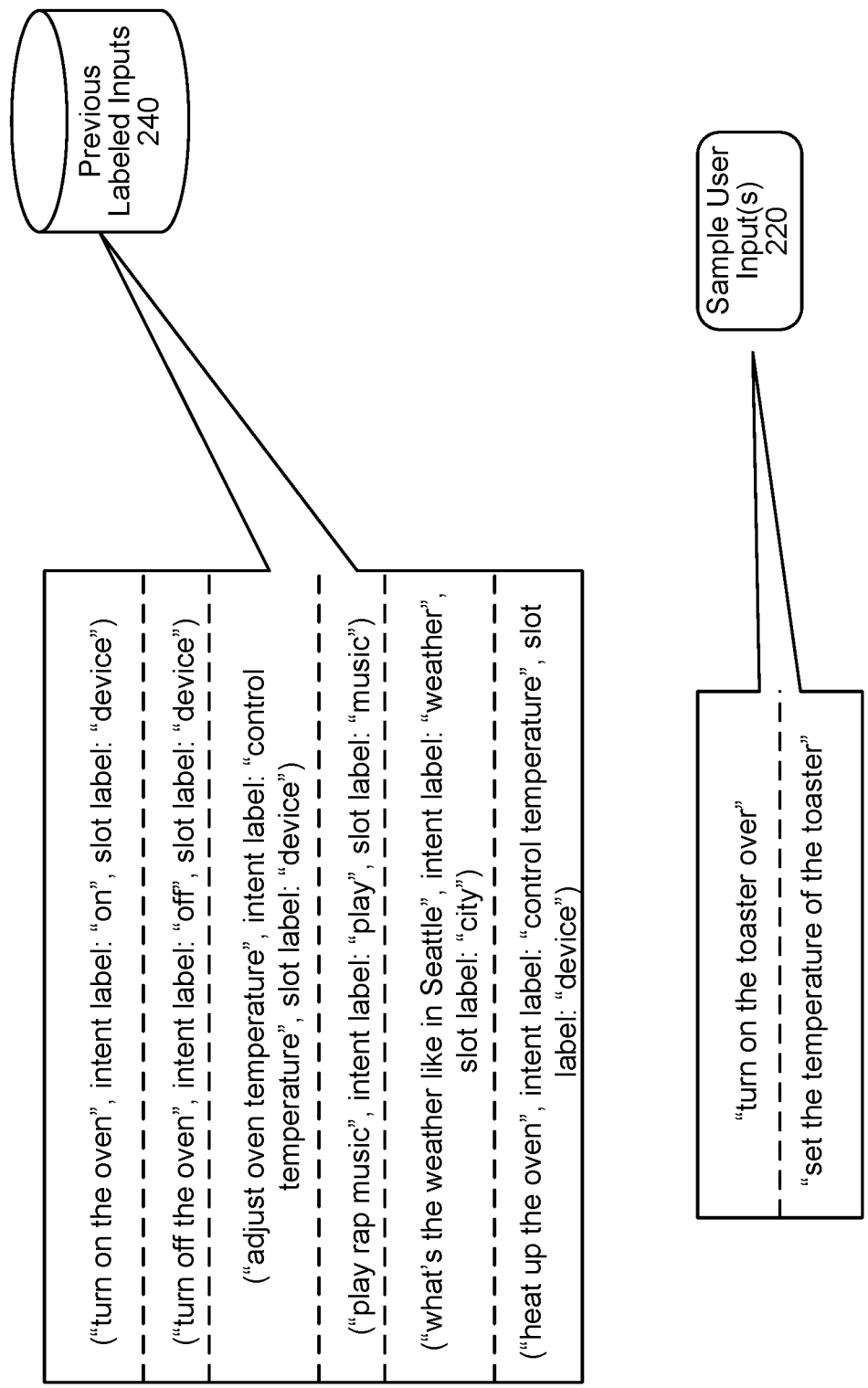
FIG. 4 illustrates example previous user inputs and sample user inputs to be used to create the new functionality.

FIG. 4 illustrates example previous user inputs 240 and example sample user inputs 220 to be used to create the new functionality. As illustrated, the previous labeled inputs 240 may include text representing previous user inputs, corresponding intent labels and slot labels. For example, the previous labeled inputs 240 may include first data related to a first previous input: ("turn on the oven," intent label: "on", slot label: device), second data related to a second previous input: ("turn off the oven," intent label: "off", slot label: device), third data related to a third previous input: ("adjust oven temperature," intent label: "control temperature," slot label: "device"), fourth data related to a fourth previous input: ("play a rap song," intent label: "play", slot label: "song"), fifth data related to a fifth previous input: ("what's the weather like in Seattle," intent label: "weather", slot label: "city"), etc. The sample user inputs 220 may include text such as "turn on the toaster oven" and "set the temperature of the toaster."

In a non-limiting example, a developer of a new toaster may want the NLU system to recognize an input "turn on the toaster oven" and turn on the toaster. That phrase may be provided by the developer as the sample input, the system, via processing as described herein, realizes that the sample input is textually similar to the stored user input "turn on the oven." Then the system offers the developer the stored user input (and its associated intent and slot) as an example input to use with the toaster.

In some embodiments, the system also notices that a stored user input "Alexa, heat up" is also associated with the same intent and slot labels as "turn on the oven." Then the system asks the developer, whether the developer would like to add the user input "Alexa, heat up" to the new functionality. The system may indicate to the developer that the user input is associated with the same intent and slot as the previous user input. In some cases, the system may indicate to the developer that the user input is often provided by users who provide the previous user input.

The input matching component 230 may send one or more previous inputs 250 (that are similar to or match the sample user input(s) 220) to the user interface component 210 to display to the developer 5 via the device 112. The previous inputs 250 may be text representing the previous user input, the corresponding intent label and the corresponding slot label. In some cases, the previous inputs 250 may also include a corresponding domain label.

In some embodiments, the input matching component 230 may determine similarity data indicating how similar the sample user input 220 is to the previous user input 250. The input matching component 230 may send the similarity data (e.g., 255) to the user interface component 210 to display on the device 112. The similarity data may be a score, a confidence level (e.g., high, medium, low), a ranking or other data representing how similar the sample user input 220 is to the previous user input 250.

In some cases, the user interface component 210 may receive data 260 representing a confirmation from the developer 5 to use one or more of the displayed previous inputs, intent labels and slot labels to create the new functionality. In other cases, the developer 5 may provide input representing a change in the displayed intent labels and slot labels. In either case, the user interface component 210 may determine data 265 representing the user inputs, intents and slots to be used to create the new functionality. For example, the data 265 may be represented as {(text for first user input, first intent, first slot), (text for second user input, first intent, second slot), (text for third user input, second intent, third slot) . . . } The user input(s) 265 may be send to the NLU model system 270 for further processing as described in relation to FIG. 5.

The language NLU build component 280 may be configured to determine if the new functionality can be extended to various natural languages. In one embodiment, the system(s) 120 and the NLU model system 270 may be configured to process user inputs in English and create/enable the new functionality with NLU models configured to process English language inputs. The language NLU build component 280 may access data relating to NLU models for other natural languages (e.g., Spanish, Japanese, Hindi, German, French, etc.), and may determine if these NLU models support one or more user inputs in their corresponding language. The language NLU build component 280 may determine which NLU models for other languages support the intent and slot corresponding to the user input 265. For example, the language NLU build component 280 may determine a translation of the user input 265 and its corresponding intent and slot labels into Spanish and Japanese, determine that a first NLU model is configured to process the intent and slot in Spanish and a second NLU model is configured to process the intent and slot in Japanese, and determine whether the user input in Spanish is supported by the first NLU model and the user input in Japanese is supported by the second NLU.

In some cases, the language NLU build component 280 may perform input matching (as described in connection with component 230) with respect to the translated user input to be used to invoke the new functionality and previous inputs stored in another database (storing data similar to 240) in the respective natural language to determine if the translated user input is supported in that natural language.

The language NLU build component 280 may send data to the user interface component 210 representing the results of checking NLU models for various languages. For example, the language NLU build component 280 may send data indicating that the new functionality can be extended to Spanish using at least one of the user inputs 265. The data may include the intent and slot in Spanish corresponding to the user input 265, and may also include the user input corresponding to the Spanish NLU models.

If the user input is not currently supported in other languages, the language NLU build 280 may send data to the user interface component 210 indicating so. For example, the language NLU build component 280 may send data indicating that the new functionality cannot be extended to Japanese because the NLU models are not configured to process any of the user inputs 265. The data may also include an indication of whether there are future development plans or a development plan in progress to configure the NLU models to support any of the user inputs 265 in Japanese. The language NLU build component 280 may determine this by retrieving project data, team data, or the like associated with the NLU models for Japanese.

The user interface component 210 may display the data received from the language NLU build component 280 on the interface at the device 112 to convey the information to the developer 5 regarding extendability of the new functionality to various languages. The developer 5 may indicate via the displayed interface on the device 112 whether or not to extend the new functionality to one or more languages, and may also indicate which user inputs to use to invoke the new functionality in various languages. The data received by the user interface component 210 may be sent to the language NLU build component 280, which may initiate build and testing of NLU models in the languages selected by the developer 5 as described in relation to the NLU model system 270.

Figure 5:
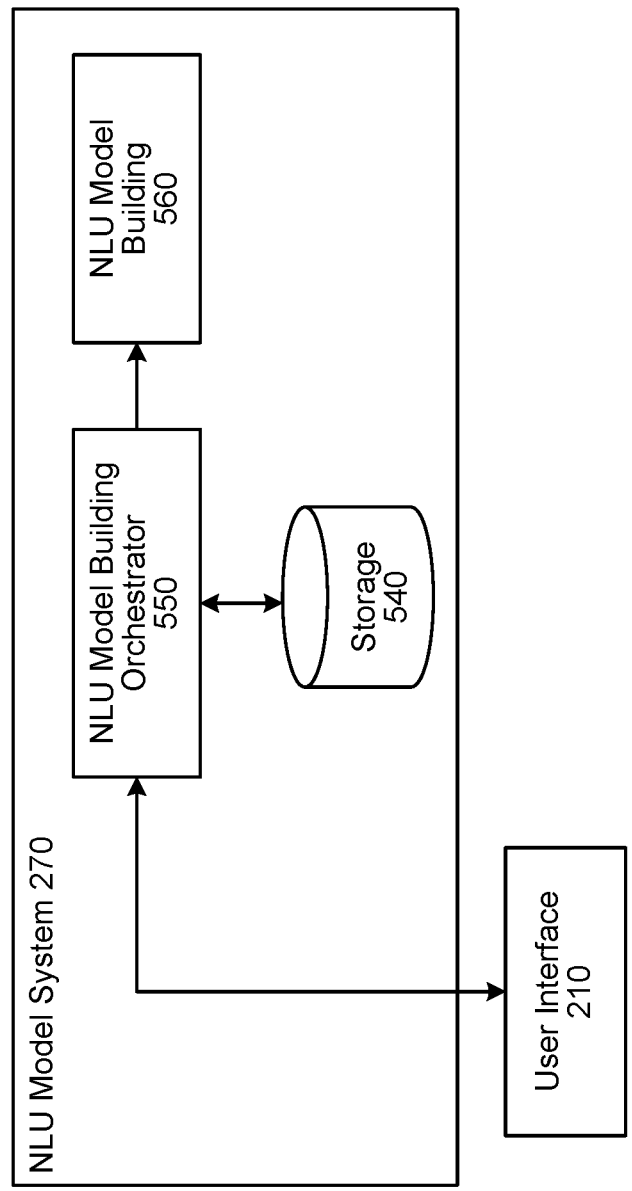
FIG. 5 is a conceptual diagram illustrating the components used to configure the NLU models for the new functionality, in accordance with embodiments of the present disclosure.

FIG. 5 illustrates components of the NLU model system 270. The user interface component 210 may send the data 265 to the NLU model building orchestrator component 550 to initiate configuration of NLU models to support invocation of the new functionality using the user inputs 265. In some examples, the component 550 may receive such data in response to receiving, from the device 112 via the user interface, an indication/confirmation 260 from the developer 5 to initiate NLU model builds so that the user inputs can be used to invoke the new functionality.

The storage 540 may store data corresponding to the new functionality that is to be converted into NLU models. Different portions of data that may be stored in the storage 540 include NLU schemas, domain definitions, parameters associated with domain definitions, exact match rules, etc.

The NLU model building orchestrator component 550 may communicate with an NLU model building component 560 for the purpose of coordinating the generation of NLU models. Thus, the NLU model building orchestrator component 550 may send the data, to be converted into an NLU model, to the NLU model building component 560.

The NLU model building component 560 may test received data to ensure the data is compliant with various requirements of properly generating an NLU model. For example, the NLU model building component 560 may ensure data is in the proper case (e.g., exact match rules may require data be in all capital letters). Various other testing is also possible.

After testing the data and determining the data is compliant with all applicable requirements, the NLU model building component 560 may generate an NLU model from the data that may be configured to process the user input(s) 265 and cause invocation of the new functionality.

The NLU model may be associated with various components that may be modified by the NLU model system 270 to incorporate the new functionality. Such components may include FSTs, NLU rules, domain definitions, etc.

As used herein, an "FST" may refer to a data structure that may include grammars representing user inputs as paths that may be traversed during NLU processing. The FST may include data corresponding to many different potential NLU outputs that the system may determine as a result of a particular user input. During runtime the system may use a user input to determine a path through the FST (i.e., traverse the FST) to determine a set of nodes most likely to correspond to the user input. In an example, the FST component may generate an FST representing one or more natural language texts corresponding to one or more user inputs.

As used herein, an "NLU rules" may refer to one or more intent labels, with each intent label associated with one or more slots. As used herein, a "slot" may refer to an expected portion of a user input corresponding to an intent label. The NLU rule component may provide, for example, one or more grammars for natural language text associated with a user input. Additionally or alternatively, the NLU rule component may validate whether modifications required to NLU rules to incorporate the new functionality is supported by an runtime NLU component of the system(s) 120. The NLU rule component may also employ rules that parse a given input and map to a given output based on exact matching or pattern matching (where inputs follow some pattern).

As used herein, "domain definitions" may refer to data defining the domains supported by the NLU system, including the corresponding intents and slots.

In an example embodiment, the NLU model system 270 sends build results data 275 to the user interface component 210. The data 275 may represent modifications required to the FST component, NLU rule component, domain definitions, and other components to incorporate the new functionality or the changes to the functionality. The build results data 275 may identify the components (e.g., by name, ID number, location of data storage, etc.) that require modifications, and the user interface component 210 may cause the device 112 and/or the device 114 to display the data identifying such components so that the developer 5 and/or the system manager 7 are able to see which components are affected.

In an example, one or more data types may be associated with endpoint components configured to detect when an NLU model, at runtime, is outputting incorrect results. Such a component may send, to the user interface component 210, data (e.g., build results data 275 representing an NLU model is producing incorrect results.

Although the above describes receiving sample user inputs from a developer to configure a NLU system for new functionality, the same techniques can be used to enable a developer to modify an existing functionality. A developer may add, remove or modify user inputs associated with an existing functionality to configure the NLU system to invoke the functionality using the updated user inputs.

FIG. 6 illustrates various runtime components of the system(s) 120. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 620 to perform wakeword detection to determine when a user intends to speak an input to the system(s) 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 620 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 611, representing the audio 11, to the system(s) 120. The audio data 611 may include data corresponding to the wakeword, or the device 110a may remove the portion of the audio corresponding to the wakeword prior to sending the audio data 611 to the system(s) 120.

An orchestrator component 630 may receive the audio data 611. The orchestrator component 630 may include memory and logic that enables the orchestrator component 630 to transmit various pieces and forms of data to various components of the system, as well as perform other operations.

The orchestrator component 630 sends the audio data 611 to an ASR component 650. The ASR component 650 transcribes the audio data 611 into text data. The text data output by the ASR component 650 represents one or more than one (e.g., in the form of an n-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., subword units, such as phonemes, etc.) and sequences of sounds to identify words that match the sequence of sounds of the speech represented in the audio data 611. The ASR component 650 outputs text data representing one or more ASR hypotheses. The text data output by the ASR component 650 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 613 representing the text-based user input. The device 110*a* may send the text data 613 to the system(s) 120. The orchestrator component 630 may receive the text data 613.

The orchestrator component 630 may send text data (e.g., text data output by the ASR component 650 or the received text data 613) to an NLU component 660.

The NLU component 660, implementing NLU models, attempts to make a semantic interpretation of the phrase(s) or statement(s) represented in the received text data. That is, the NLU component 660 determines one or more meanings associated with the phrase(s) or statement(s) represented in the text data based on words represented in the text data. The NLU component 660 determines an intent representing an action that a user desires be performed as well as pieces of the text data that allow a device (e.g., the device 110, the system(s) 120, a skill 690, a skill system(s) 625, etc.) to execute the intent. For example, if the text data corresponds to "play Adele music," the NLU component 660 may determine an intent that the system(s) 120 output music and may identify "Adele" as an artist. For further example, if the text data corresponds to "what is the weather," the NLU component 660 may determine an intent that the system(s) 120 output weather information associated with a geographic location of the device 110. In another example, if the text data corresponds to "turn off the lights," the NLU component 660 may determine an intent that the system(s) 120 turn off lights associated with the device(s) 110 or the user(s) 5. The NLU component 660 may output NLU results data (which may include tagged text data, indicators of intent, etc.).

As described above, the system(s) 120 may perform speech processing using two different components (e.g., the ASR component 650 and the NLU component 660). One skilled in the art will appreciate that the system(s) 120, in at least some implementations, may implement a spoken language understanding (SLU) component that is configured to process audio data 611 to generate NLU results data. In such an implementation, the SLU component may implement the herein described NLU models.

In some examples, a speech-language understanding (SLU) component may be equivalent to the ASR component 650 and the NLU component 660. For example, the SLU component may process audio data 611 and generate NLU data. The NLU data may include intent data and/or slot data so that directives may be determined based on the intent data and/or the slot data. While the SLU component may be equivalent to a combination of the ASR component 650 and the NLU component 660, the SLU component may process audio data 611 and directly generate the NLU data, without an intermediate step of generating text data (as does the ASR component 650). As such, the SLU component may take audio data 611 representing speech and attempt to make a semantic interpretation of the speech. That is, the SLU component may determine a meaning associated with the speech and then implement that meaning. For example, the SLU component may interpret audio data 611 representing speech from the user 5 in order to derive an intent or a desired action or operation from the user 5. In some examples, the SLU component outputs a most likely NLU response (e.g., hypothesis) recognized in the audio data 611, or multiple hypotheses in the form of a lattice or an N-best list with individual hypotheses corresponding to confidence scores or other scores (such as probability scores, etc.).

The NLU component 660 may be in communication with the NLU model system 270. The NLU model system 270 may send NLU model data to the NLU component 660 that incorporates data enabling invocation of the new functionality during runtime.

The system(s) 120 may include one or more skills 690. A "skill" may be software running on the system(s) 120 that is akin to a software application running on a traditional computing device. That is, a skill 690 may enable the system(s) 120 to execute specific functionality in order to provide data or produce some other requested output. The system(s) 120 may be configured with more than one skill 690. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 690 may operate in conjunction between the system(s) 120 and other devices, such as the device 110, in order to complete certain functions. Inputs to a skill 690 may come from speech processing interactions or through other interactions or input sources. A skill 690 may include hardware, software, firmware, or the like that may be dedicated to a particular skill 690 or shared among different skills 690.

In addition or alternatively to being implemented by the system(s) 120, a skill 690 may be implemented by a skill system(s) 625. Such may enable a skill system(s) 625 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 690 dedicated to interacting with more than one skill system(s) 625.

Unless expressly stated otherwise, reference herein to a "skill," or a derivative thereof, may include a skill 690 operated by the system(s) 120 and/or skill operated by a skill system(s) 625. Moreover, the functionality described herein as a skill may be referred to using many different terms, such as an action, bot, app, or the like.

The system(s) 120 may include a TTS component 680. The TTS component 680 may generate audio data (e.g., synthesized speech) from text data using one or more different methods. Text data input to the TTS component 680 may come from a skill 690, the orchestrator component 630, or another component of the system(s) 120.

In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The system(s) 120 may include a user recognition component 695 that recognizes one or more users associated with data input to the system(s) 120. The user recognition component 695 may take as input the audio data 611 and/or the text data 613. The user recognition component 695 may perform user recognition by comparing speech characteristics in the audio data 611 to stored speech characteristics of users. The user recognition component 695 may additionally or alternatively perform user recognition by comparing biometric data (e.g., fingerprint data, iris data, etc.), received by the system(s) 120 in correlation with a user input, to stored biometric data of users. The user recognition component 695 may additionally or alternatively perform user recognition by comparing image data (e.g., including a representation of at least a feature of a user), received by the system(s) 120 in correlation with a user input, with stored image data including representations of features of different users. The user recognition component 695 may perform other or additional user recognition processes, including those known in the art. For a particular user input, the user recognition component 695 may perform processing with respect to stored data of users associated with the device 110 that captured the user input.

The user recognition component 695 determines whether a user input originated from a particular user. For example, the user recognition component 695 may generate a first value representing a likelihood that a user input originated from a first user, a second value representing a likelihood that the user input originated from a second user, etc. The user recognition component 695 may also determine an overall confidence regarding the accuracy of user recognition operations.

The user recognition component 695 may output a single user identifier corresponding to the most likely user that originated the user input. Alternatively, the user recognition component 695 may output multiple user identifiers (e.g., in the form of an N-best list) with respective values representing likelihoods of respective users originating the user input. The output of the user recognition component 695 may be used to inform NLU processing, processing performed by a skill 690, as well as processing performed by other components of the system(s) 120 and/or other systems.

The system(s) 120 may include profile storage 670. The profile storage 670 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 670 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 670 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith.

Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 670 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 7:
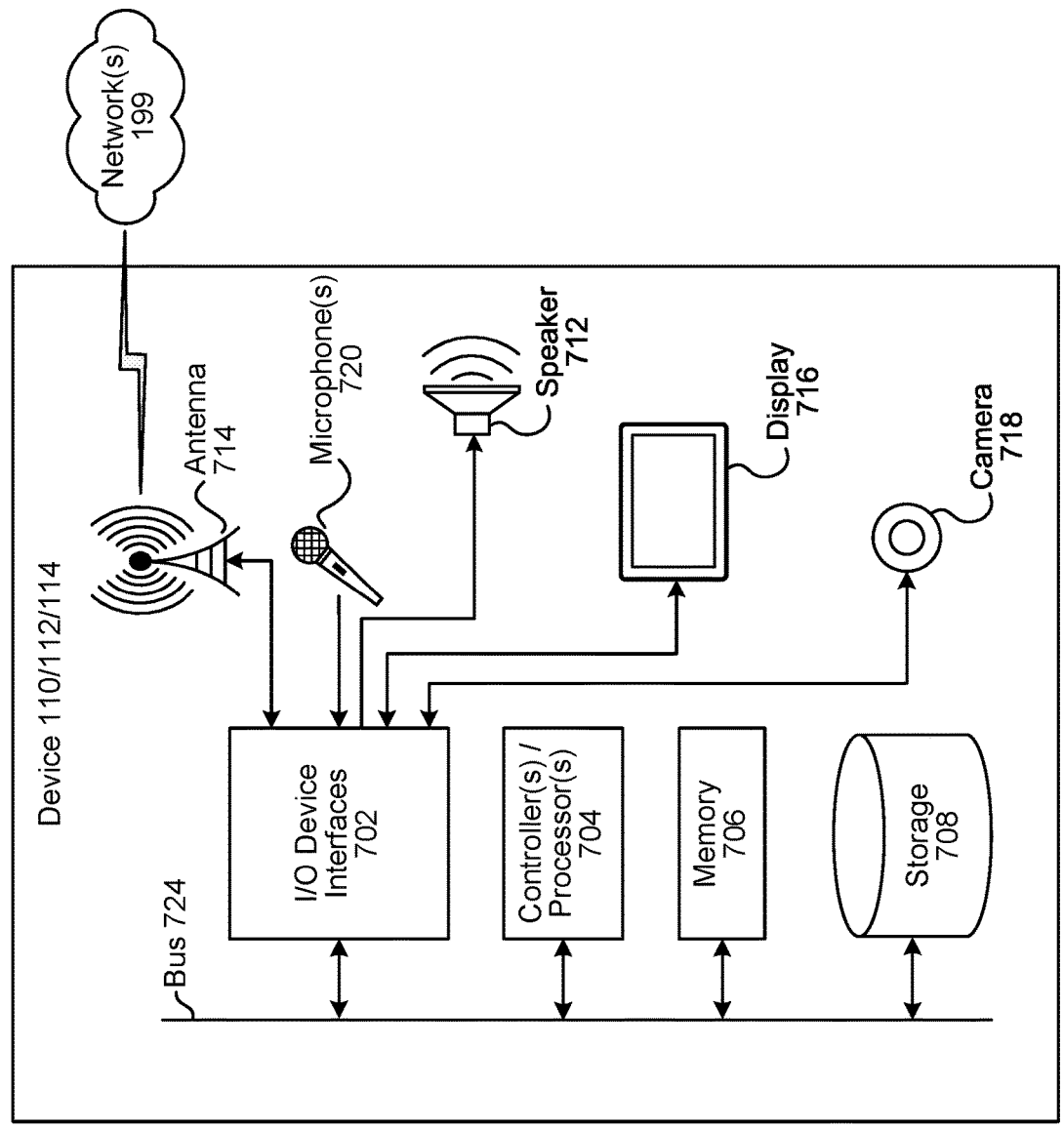
FIG. 7 is a block diagram conceptually illustrating example components of a device, in accordance with embodiments of the present disclosure.
Figure 8:
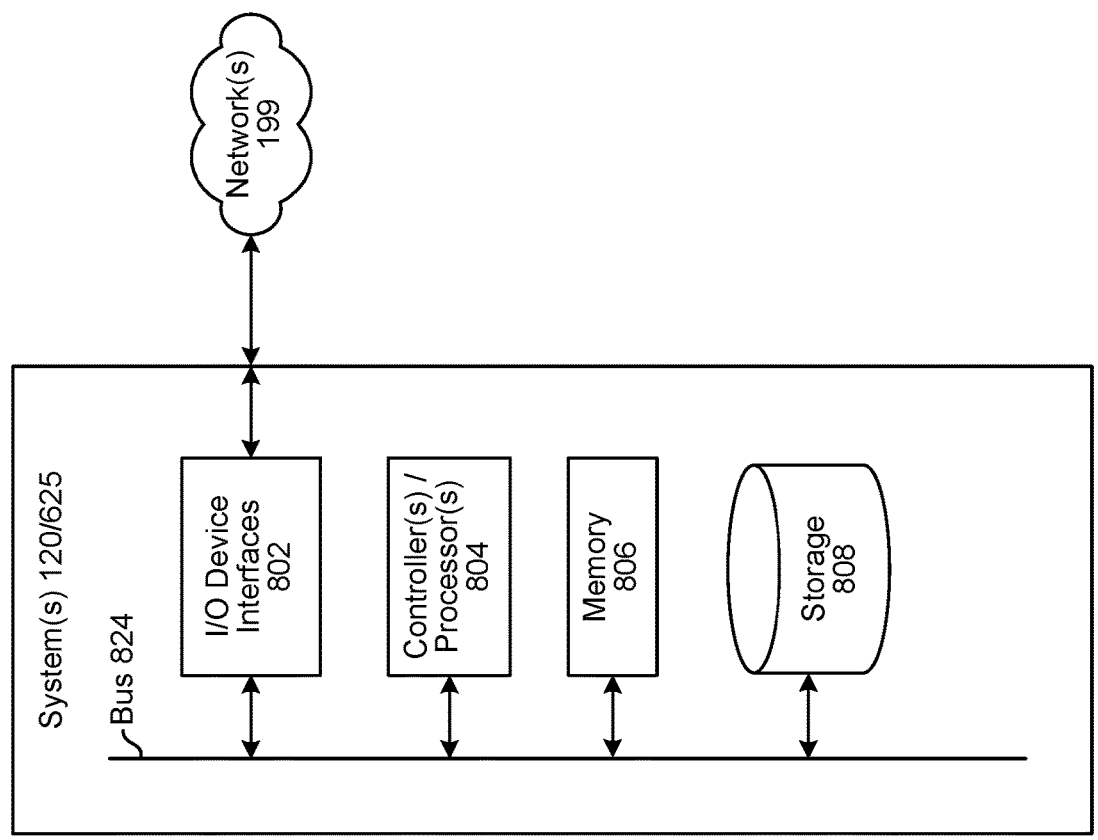
FIG. 8 is a block diagram conceptually illustrating example components of a system, in accordance with embodiments of the present disclosure.

FIG. 7 is a block diagram conceptually illustrating a device 110/112/114 that may be used with the system. FIG. 8 is a block diagram conceptually illustrating example components of a remote device, such as the system(s) 120, which may assist with ASR processing, NLU processing, etc., and the skill system(s) 625. A system (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/625) may be included in the overall system of the present disclosure, such as one or more systems 120 for performing ASR processing, one or more systems 120 for performing NLU processing, one or more skill system(s) 625, etc. In operation, each of these systems may include computer-readable and computer-executable instructions that reside on the respective device (120/625), as will be discussed further below.

Each of these devices (110/112/114/120/625) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/112/114/120/625) may also include a data storage component (708/808) for storing data and controller/processor-executable instructions. Each data storage component (708/808) may individually include one or more non-volatile storage types such as magnetic storage, optical storage, solid-state storage, etc. Each device (110/112/114/120/625) may also be connected to removable or external non-volatile memory and/or storage (such as a removable memory card, memory key drive, networked storage, etc.) through respective input/output device interfaces (702/802).

Computer instructions for operating each device (110/112/114/120/625) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/112/114/120/625) includes input/output device interfaces (702/802). A variety of components may be connected through the input/output device interfaces (702/802), as will be discussed further below. Additionally, each device (110/112/114/120/625) may include an address/data bus (724/824) for conveying data among components of the respective device. Each component within a device (110/112/114/120/625) may also be directly connected to other components in addition to (or instead of) being connected to other components across the bus (724/824).

Referring to FIG. 7, the device 110/112/114 may include input/output device interfaces 702 that connect to a variety of components such as an audio output component such as a speaker 712, a wired headset or a wireless headset (not illustrated), or other component capable of outputting audio. The device 110/112/114 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/112/114 may additionally include a display 716 for displaying content. The device 110/112/114 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110/112/114, the system(s) 120, or the skill system(s) 625 may include their own dedicated processors, memory, and/or storage. Alternatively, one or more of the components of the device(s) 110/112/114, the system(s) 120, or the skill system(s) 625 may utilize the I/O interfaces (702/802), processor(s) (704/804), memory (706/806), and/or storage (708/808) of the device(s) 110/112/114 system(s) 120, or the skill system(s) 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112/114, the system(s) 120, and the skill system(s) 625, as described herein, are illustrative, and may be located as a stand-alone device or may be included, in whole or in part, as a component of a larger device or system.

Figure 9:
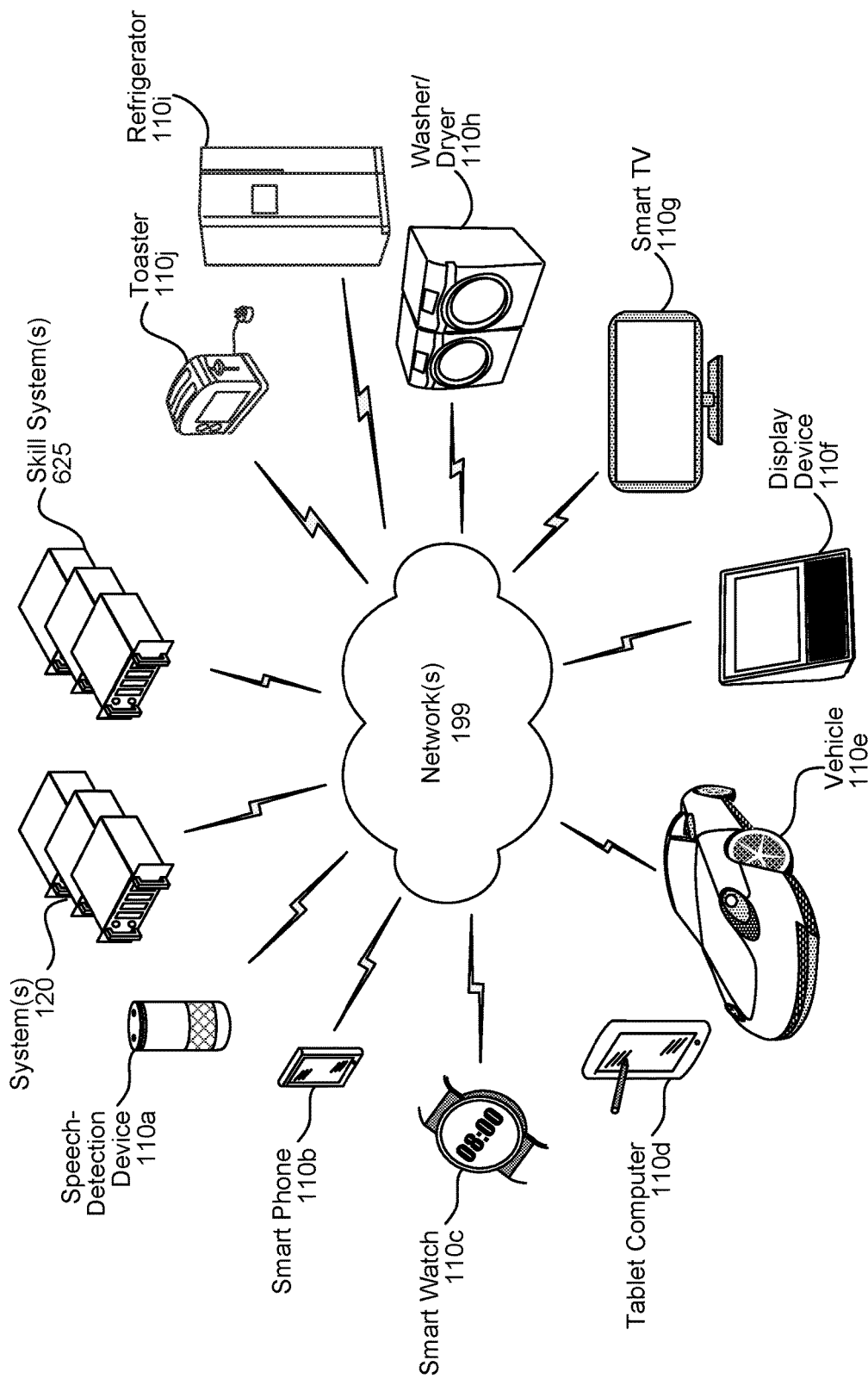
FIG. 9 illustrates an example of a computer network for use with the overall system, in accordance with embodiments of the present disclosure.

As illustrated in FIG. 9, multiple devices (110a-110j, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a developer device, first text data representing a sample utterance to be used to invoke a first functionality to be supported by a natural language processing system;
   receiving, from the developer device, first context data associated with the sample utterance;
   determining, from a database storing data corresponding to a plurality of previous utterances processed by the natural language processing system, a first previous utterance similar to the sample utterance using the first text data and second text data representing the first previous utterance;
   determining, using the data stored in the database, second context data associated with the first previous utterance;
   determining that the first context data matches the second context data;
   determining, using the data stored in the database, a first intent label corresponding to the first previous utterance;
   determining, using the data stored in the database, a first slot label corresponding to the first previous utterance;
   causing the developer device to display text representing the first previous utterance, the first intent label and the first slot label;
   receiving, from the developer device, an indication to configure the natural language processing system to support invocation of the first functionality using data for the first previous utterance;
   determining first natural language understanding (NLU) model data corresponding to a first NLU model configured to process inputs corresponding to at least one of the first intent label or the first slot label; and
   configuring, using the first NLU model data, a second NLU model to process the sample utterance and the first previous utterance to invoke the first functionality.

2. The computer-implemented method of claim 1, further comprising:
   determining that the first NLU model is configured to process inputs represented in a first language;
   determining a third NLU model configured to process inputs represented in a second language;
   determining a second sample utterance representing the sample utterance in the second language;
   determining a second previous utterance representing the first previous utterance in the second language;
   determining that the third NLU model is configured to process the second previous utterance;
   causing the developer device to display second text representing the second language, the second sample utterance and the second previous utterance;
   receiving, from the developer device, a second indication to configure the natural language processing system to support invocation of the first functionality in the second language using the second sample utterance and the second previous utterance; and
   configuring, using second NLU model data associated with the third NLU model, a fourth NLU model to process the second sample utterance and the second previous utterance to invoke the first functionality.

3. The computer-implemented method of claim 1, further comprising:
   receiving, from the developer device, third text data representing a second sample utterance to be used to invoke the first functionality;
   determining, from the database, a second previous utterance similar to the second sample utterance using the third text data and fourth text data representing the second previous utterance;
   determining, using the database, a second intent label corresponding to the second previous utterance;
   causing the developer device to display second text representing the second previous utterance and the second intent label;
   receiving, from the developer device, data indicating a third intent label to be associated with the second previous utterance;
   determining second NLU model data corresponding to a third NLU model configured to process inputs corresponding to the third intent label, and
   configuring, using the second NLU model data, a fourth NLU model to process the second sample utterance and the second previous utterance to invoke the first functionality.

4. The computer-implemented method of claim 1, further comprising:
   determining, using second data, a second intent label corresponding to the first intent label, the second data indicating that a second input corresponding to the second intent label is frequently received by the natural language processing system after a first input corresponding to the first intent label is received;
determining, using the database, a second previous utterance corresponding to the second intent label and the first slot label;
causing the developer device to display second text representing the second previous utterance, the second intent label and the first slot label;
receiving, from the developer device, a second indication to configure the natural language processing system to support invocation of a second functionality using data for the second previous utterance;
determining second natural language understanding (NLU) model data corresponding to a third NLU model configured to process inputs corresponding to the second intent label; and
configuring, using second NLU model data, a fourth NLU model to process the second previous utterance to invoke the second functionality.

5. A computer-implemented method comprising:
receiving, from a developer device, first text data representing a sample user input to be used to invoke a functionality to be supported by a natural language processing system;
determining second text data representing a plurality of user inputs previously processed by the natural language processing system;
processing the first text data and the second text data to determine a first user input similar to the sample user input;
determining, using data stored in a database corresponding to the plurality of user inputs, an intent label corresponding to the first user input;
receiving, from the developer device, an indication to configure the natural language processing system to support invocation of the functionality using the first user input;
determining a natural language understanding (NLU) model data corresponding to a first NLU model configured to process inputs corresponding to the intent label; and
configuring, using the NLU model data, a second NLU model to process the sample user input and the first user input to invoke the functionality.

6. The computer-implemented method of claim 5, wherein processing the first text data and the second text data comprises:
determining a first feature vector representing the first text data;
determining a second feature vector representing a first portion of the second text data corresponding to the first user input;
processing the first feature vector and the second feature vector to determine first similarity data; and
determining that the first similarity data indicates that the first user input is similar to the sample user input.

7. The computer-implemented method of claim 6, further comprising:
determining a third feature vector representing a second portion of the second text data corresponding to a second user input;
processing the first feature vector and the third feature vector to determine second similarity data;
determining that the second similarity data indicates that the second user input is similar to the sample user input;
determining, using the database, a second intent label corresponding to the second user input; and
causing the developer device to display second text representing the second user input and the second intent label.

8. The computer-implemented method of claim 5, further comprising:
determining that the first NLU model is configured to process inputs in a first language;
determining a third NLU model configured to process inputs in a second language;
determining a second sample user input representing the sample user input in the second language;
determining a second user input representing the first user input in the second language;
determining that the third NLU model is configured to process the second user input;
receiving, from the developer device, a second indication to configure the natural language processing system to support invocation of the functionality in a second natural language using the second sample user input and the second user input; and
configuring, using second NLU model data associated with the third NLU model, a fourth NLU model to process the second sample user input and the second user input to invoke the functionality.

9. The computer-implemented method of claim 5, further comprising:
a determining modification data representing at least one modification to be made to a first NLU model data to configure the second NLU model;
determining, using the modification data, a finite state transducer (FST) component to process the sample user input and the first user input to invoke the functionality;
determining, using the modification data, NLU rule data to process the sample user input and the first user input to invoke the functionality;
causing the developer device to display second text representing the FST component and the NLU rule data; and
receiving, from the developer device, a first confirmation to configure the second NLU model.

10. The computer-implemented method of claim 9, further comprising:
sending, to a second device, second data causing the second device to display the second text; and
receiving, from the second device, a second confirmation to configure the second NLU model, and
wherein configuring the second NLU model comprises configuring the second NLU model in response to receiving the second confirmation.

11. The computer-implemented method of claim 5, further comprising:
receiving, from the developer device, third text data representing a second sample user input to be used to invoke the functionality;
processing the third text data and the second text data to determine a second user input similar to the second sample user input;
determining, using the database, a second intent label corresponding to the second user input;
causing the developer device to display second text representing the second user input and the second intent label;
receiving, from the developer device, data indicating a third intent label to be associated with the second user input to invoke the functionality;

determining second NLU model data corresponding to a third NLU model configured to process inputs corresponding to the third intent label; and configuring, using the second NLU model data, a fourth NLU model to process the second sample user input and the second user input to invoke the functionality.

12. The computer-implemented method of claim 5, further comprising:

determining, using second data, a second intent label corresponding to a first intent label, the second data indicating that a second input corresponding to the second intent label is frequently received by the natural language processing system within a period of time of receiving a first input corresponding to the first intent label;

determining, using the database, a second user input corresponding to the second intent label and a first slot label; and causing the developer device to display second text representing the second user input, the second intent label and the first slot label.

13. The computer-implemented method of claim 5, further comprising:

receiving, from the developer device, first context data corresponding to the sample user input;

determining, using the data stored in the database, second context data corresponding to the first user input;

determining that the first context data and the second context data match; and determining to use the first user input to determine the intent label in response to the first context data and the second context data matching.

14. A system comprising:

at least one processor; and at least one memory including instructions that, when executed by the at least one processor, cause the system to:

receive, from a developer device, first text data representing a sample user input to be used to invoke a functionality to be supported by a natural language processing system;

determine second text data representing a plurality of user inputs previously processed by the natural language processing system;

process the first text data and the second text data to determine a first user input similar to the sample user input;

determine, using data stored in a database corresponding to the plurality of user inputs, an intent label corresponding to the first user input;

receive, from the developer device, an indication to configure the natural language processing system to support invocation of the functionality using the first user input;

determine a natural language understanding (NLU) model data corresponding to a first NLU model configured to process inputs corresponding to the intent label; and configure, using the NLU model data, a second NLU model to process the sample user input and the first user input to invoke the functionality.

15. The system of claim 14, wherein the instructions that, when executed by the at least one processor, cause the system to process the first text data and the second text data further cause the system to:

determine a first feature vector representing the first text data;

determine a second feature vector representing a first portion of the second text data corresponding to the first user input;

process the first feature vector and the second feature vector to determine first similarity data; and determine that the first similarity data indicates that the first user input is similar to the sample user input.

16. The system of claim 15, wherein the instructions that, when executed by the at least one processor, further causes the system to:

determine a third feature vector representing a second portion of the second text data corresponding to a second user input;

process the first feature vector and the third feature vector to determine second similarity data;

determine that the second similarity data indicates that the second user input is similar to the sample user input;

determine, using the database, a second intent label corresponding to the second user input; and cause the developer device to display second text representing the second user input and the second intent label.

17. The system of claim 14, wherein the instructions that, when executed by the at least one processor, further causes the system to:

determine that the first NLU model is configured to process inputs in a first language;

determine a third NLU model configured to process inputs in a second language;

determine a second sample user input representing the sample user input in the second language;

determine a second previous user input representing the first user input in the second language;

determine that the third NLU model is configured to process a second user input;

receive, from the developer device, a second indication to configure the natural language processing system to support invocation of a first functionality in the second language using the second sample user input and the second user input; and configure, using second NLU model data associated with the third NLU model, a fourth NLU model to process the second sample user input and the second user input to invoke the first functionality.

18. The system of claim 14, wherein the instructions that, when executed by the at least one processor, further cause the system to:

a determine modification data representing at least one modification to be made to a first NLU model data to configure the second NLU model;

determine, using the modification data, a finite state transducer (FST) component to process the sample user input and the first user input to invoke the functionality;

determine, using the modification data, NLU rule data to process the sample user input and the first user input to invoke the functionality;

cause the developer device to display second text representing the FST component and the NLU rule data; and receive, from the developer device, a first confirmation to configure the second NLU model.

19. The system of claim 18, wherein the instructions that, when executed by the at least one processor, further cause the system to:

send, to a second device, second data causing the second device to display the second text; and receive, from the second device, a second confirmation to configure the second NLU model, and wherein the instructions that cause the system to configure the second NLU model further causes the system to configure the second NLU model in response to receiving the second confirmation.

20. The system of claim 14, wherein the instructions that, when executed by the at least one processor, further cause the system to:
receive, from the developer device, third text data representing a second sample user input to be used to invoke the functionality;
process the third text data and the second text data to determine a second user input similar to the second sample user input;
determine, using the database, a second intent label corresponding to the second user input;
cause the developer device to display second text representing the second user input and the second intent label;
receive, from the developer device, data indicating a third intent label to be associated with the second user input to invoke the functionality;
determine second NLU model data corresponding to a third NLU model configured to process inputs corresponding to the third intent label; and
configure, using the second NLU model data, a fourth NLU model to process the second sample user input and the second user input to invoke the functionality.

* * * * *